| United States Patent [19]
Ambruster et al. | [11] Patent Number: 4,702,268 |
| --- | --- |
| | [45] Date of Patent: Oct. 27, 1987 |

[54] GAS VENTING VALVE

[75] Inventors: Kurt Ambruster, Bellevue; Charles J. Green, Vashon; John M. Morris, Auburn, all of Wash.

[73] Assignee: GT Development Corporation, Tukwila, Wash.

[21] Appl. No.: 946,497

[22] Filed: Dec. 24, 1986

[51] Int. Cl.[4] ............................................. F16K 17/00
[52] U.S. Cl. ...................................... 137/202; 137/43
[58] Field of Search ....................... 137/202, 39, 38, 43

[56] References Cited

U.S. PATENT DOCUMENTS

| 785,594 | 3/1905 | Crispin . | |
| --- | --- | --- | --- |
| 1,724,878 | 8/1929 | Jensen . | |
| 2,271,786 | 2/1942 | Watkins | 137/53 |
| 2,510,098 | 6/1950 | Geisler | 137/69 |
| 2,677,939 | 5/1954 | Clute | 62/1 |
| 2,919,707 | 1/1960 | Seidler | 137/39 |
| 3,568,695 | 3/1971 | DeFrees | 137/43 |
| 3,662,725 | 5/1972 | Dragon et al. | 123/136 |
| 3,757,987 | 9/1973 | Marshall | 220/44 |
| 3,938,692 | 2/1976 | Crute | 220/203 |
| 3,970,098 | 7/1976 | Boswank et al. | 137/39 |
| 4,299,247 | 11/1981 | Keller | 137/43 |
| 4,325,398 | 4/1982 | Green | 137/39 |
| 4,390,107 | 6/1983 | Hukuta | 220/202 |
| 4,457,325 | 7/1984 | Green | 137/39 |
| 4,487,215 | 12/1984 | Green | 137/43 |

FOREIGN PATENT DOCUMENTS

| 1150850 | 6/1963 | Fed. Rep. of Germany . |
| --- | --- | --- |
| 853806 | 12/1939 | France . |
| 405385 | 2/1934 | United Kingdom . |
| 1400062 | 7/1972 | United Kingdom . |

Primary Examiner—Alan Cohan
Attorney, Agent, or Firm—Delbert J. Barnard

[57] ABSTRACT

A gas vent orifice (78, 148) is located within a gas vent passageway. A closure ball (80, 154) is located upstream of the orifice (78, 148). A piston (66, 166) is located downstream of the orifice (78, 148). The piston (66, 166) includes a projection (76, 170) which projects into the orifice (78, 148), for dislodging the closure ball (80, 154) from its seated position. A mass in the form of a spherical ball (74, 160) functions to move the piston (66, 166) to dislodge the closure ball (80, 154). The mass (80, 154) rests on a conical ramp (56, 126) and the slope of the ramp serves to direct the mass (80, 154) against the piston (66, 166). A steep sloped ramp (126) may be used in combination with a piston (166) having a cylindrical center portion (168). Or, a shallow ramp (56) may be used in combination with a piston (66) having a flat upper surface and radial legs (68, 70) which fit within radial slots (58) in the ramp (56).

25 Claims, 9 Drawing Figures

GAS VENTING VALVE

DESCRIPTION

1. Technical Field

The present invention relates to a gas venting valve. More particularly, it relates to the provision of a gas venting valve of a type including a closure ball that is seated by liquid forces, but which following a closure caused by a liquid slosh, will not stay closed. Rather, the valve is adapted to quickly and efficiently unseat the closure ball and resume venting in response to normal venting conditions.

2. Background Art

Reference is made to the following United States patents owned by GT Development Corporation of Seattle, Wash.: U.S. Pat. No. 4,325,398, granted Apr. 20, 1986, to Charles J. Green, and entitled Safety and Venting Valves for Fuel Tanks Carried on Vehicles; U.S. Pat. No. 4,457,325, granted July 3, 1984, to Charles J. Green, and entitled Safety and Venting Cap for Vehicle Fuel Tanks: and U.S. Pat. No. 4,487,215, granted Dec. 11, 1984 to Charles J. Green and entitled Gas Venting Valve.

These patents and the patents cited in them should be considered for the purpose of putting the present invention into proper perspective relative to the prior art.

3. Disclosure of the Invention

Vent valves of the present invention are basically characterized by a passageway having a normally lower inlet and a normally upper outlet. A wall means is provided in the passageway between the inlet and outlet which defines an orifice. The closure ball has a larger diameter than the orifice. A conical support surface is spaced upwardly from the orifice. The conical support surface includes a central opening and surface means surrounding the opening. The surface means slopes upwardly and outwardly from the central opening. A ball-shaped mass is supported on the conical surface. The mass is larger in diameter than the central opening. A piston member is positioned between the mass and the orifice. The piston member has an upper portion positioned in the central opening and a lower portion positioned to project into the orifice. The piston is movable between a lower position in which the lower portion projects through the orifice into contact with the closure ball, to prevent the closure ball from seating in the orifice, and an upper position in which the lower portion is spaced upwardly from said orifice, in a position to not interfere with the closure ball seating. The conical support, the piston and the mass are so dimensioned that when the mass is centered on the conical support the mass is in contact with the upper portion of the piston and biases the piston downwardly into its lower position.

Other more detailed features of the invention are hereinafter described and claimed. The claims which define the invention also constitute a description of the invention.

BRIEF DESCRIPTION OF THE DRAWING

In the drawing, like element designations refer to like parts, and:

FIG. 3 is an axial sectional view of the embodiment shown by FIGS. 1 and 2, showing the closure ball spinning in response to gas flow through the gas vent passageway;

BEST MODE FOR CARRYING OUT THE INVENTION

Figure 1:
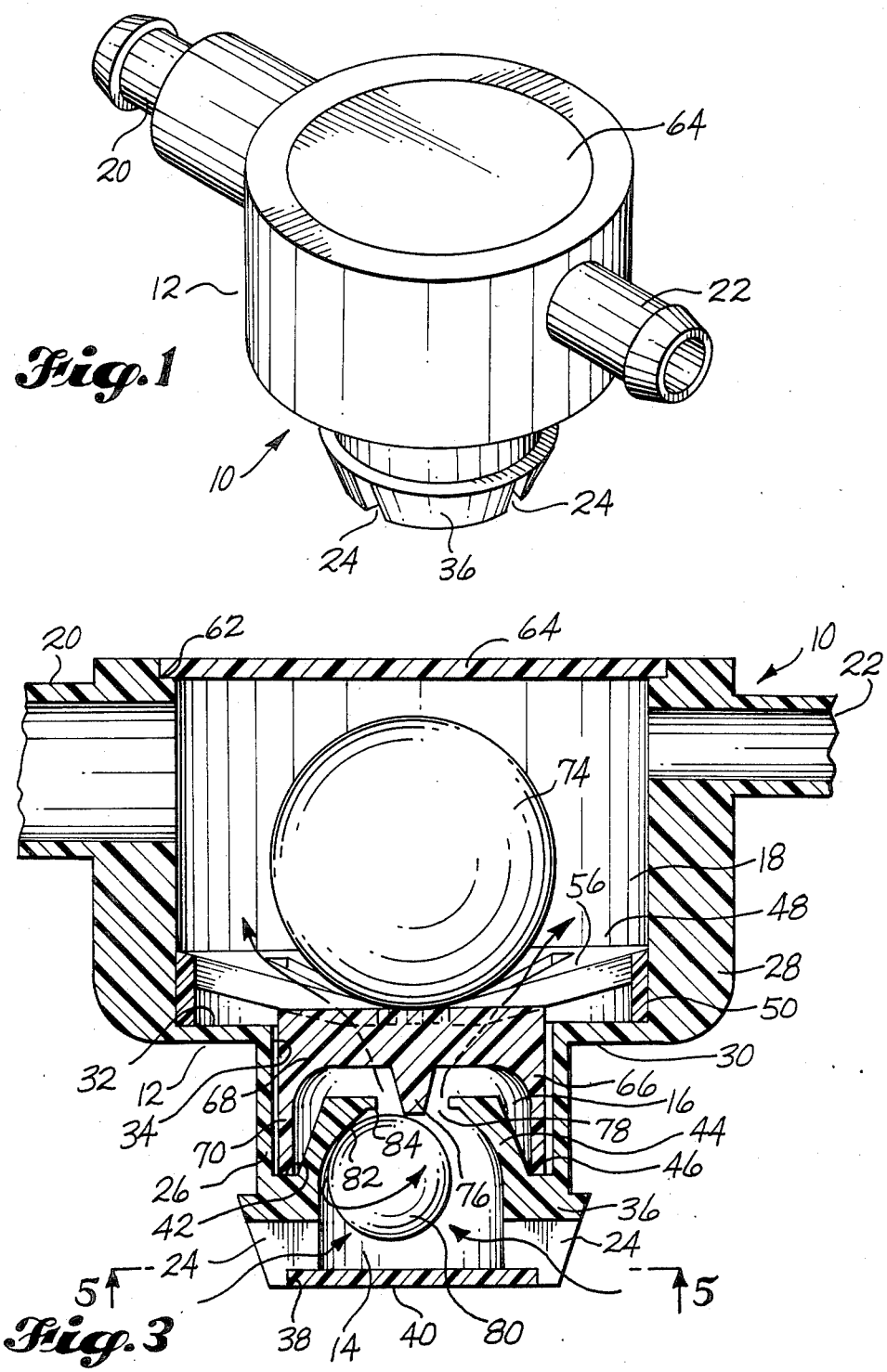
FIG. 1 is an assembled isometric view of an embodiment of the invention.

In preferred form, the gas vent valve 10 of this invention comprises a tubular housing 12 in which three chambers are formed. The lower chamber 14 may be termed a spin chamber. Above it there is a piston chamber 16. Above the piston chamber 16 there is a mass chamber 18.

The mass chamber 18 may include a pair of laterally projecting nipples 20, 22, each of which is adapted to slip fit into a vent hose (not shown). The outer ends of the nipples 20, 22 are shown to include a conventional structure for engaging an inner wall portion of a hose.

The lower end of the housing 12 includes a plurality of tangential inlet slots 24 which serve as the inlet for the gas vent valve 10. A passageway in the nipple 22 serves as an outlet for the vent valve 10. In this embodiment, the vent passageway starts with the inlet slots 24, includes a yet to be described structure within the housing 12, and ends with the vent hose (not shown) which is attached to the nipple 22.

Housing 12 includes a first diameter lower portion 26 and a larger diameter upper portion 28. A radial transition wall 30 is formed where the two portions 26, 28 meet. The inner surface of wall 30 is in the nature of a shoulder 32 which surrounds the upper end of a cylindrical space 34 within housing portion 26. The lower part of housing portion 26 is thickened at 36 and it is in a side portion of this thickened portion 36 that the inlet slots 24 are formed. A shallow socket 38 is formed in the lower end of part 36. A disk shaped closure member 40 is received within the socket 38, to form a lower closure for the spin chamber 14. Cylindrical wall 34 extends down to an annular base wall 42. A generally conical inner wall 44 extends upwardly from the region of the base wall 42. A generally annular space 46 (FIG. 3) is defined between surface 34 and wall 44. This annular space is a part of the piston chamber 15.

In preferred form, an insert 48 is provided within mass chamber 18. Insert 48 includes a cylindrical sidewall 50 and a conical ramp wall 52. The ramp wall 52 includes a central opening 54 and a conical upper surface 56. As illustrated, surface 56 slopes upwardly as it extends outwardly from the opening 54.

Figure 2:
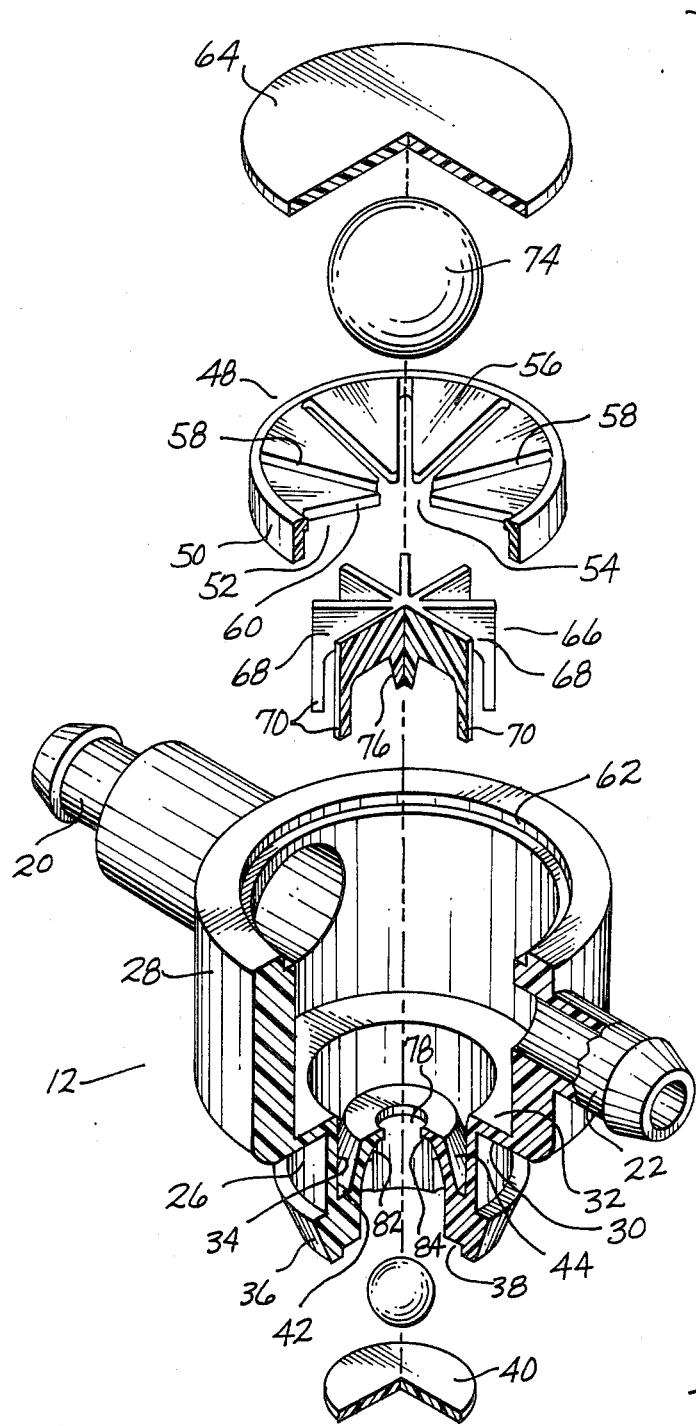
FIG. 2 is an exploded isometric view of the embodiment shown by FIG. 1.
Figure 5:
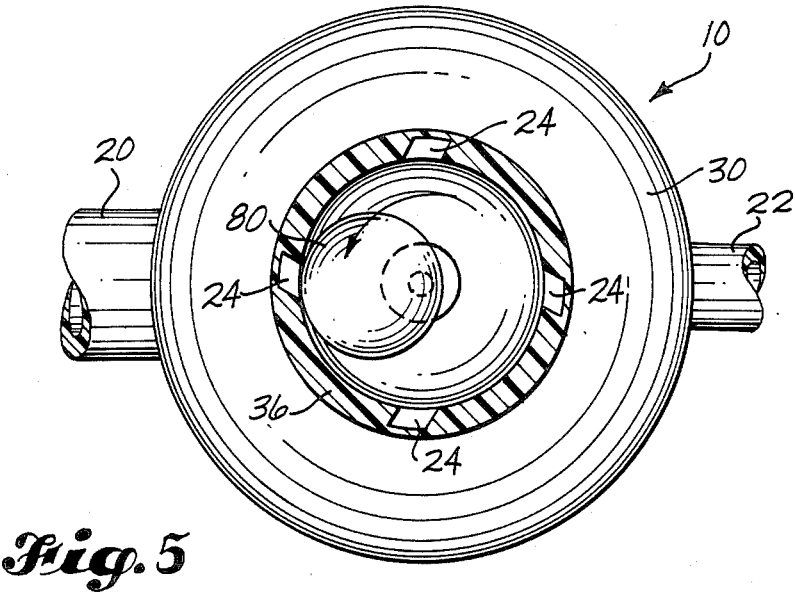
FIG. 5 is a cross sectional view taken substantially along 5—5 of FIG. 4.
Figure 6:
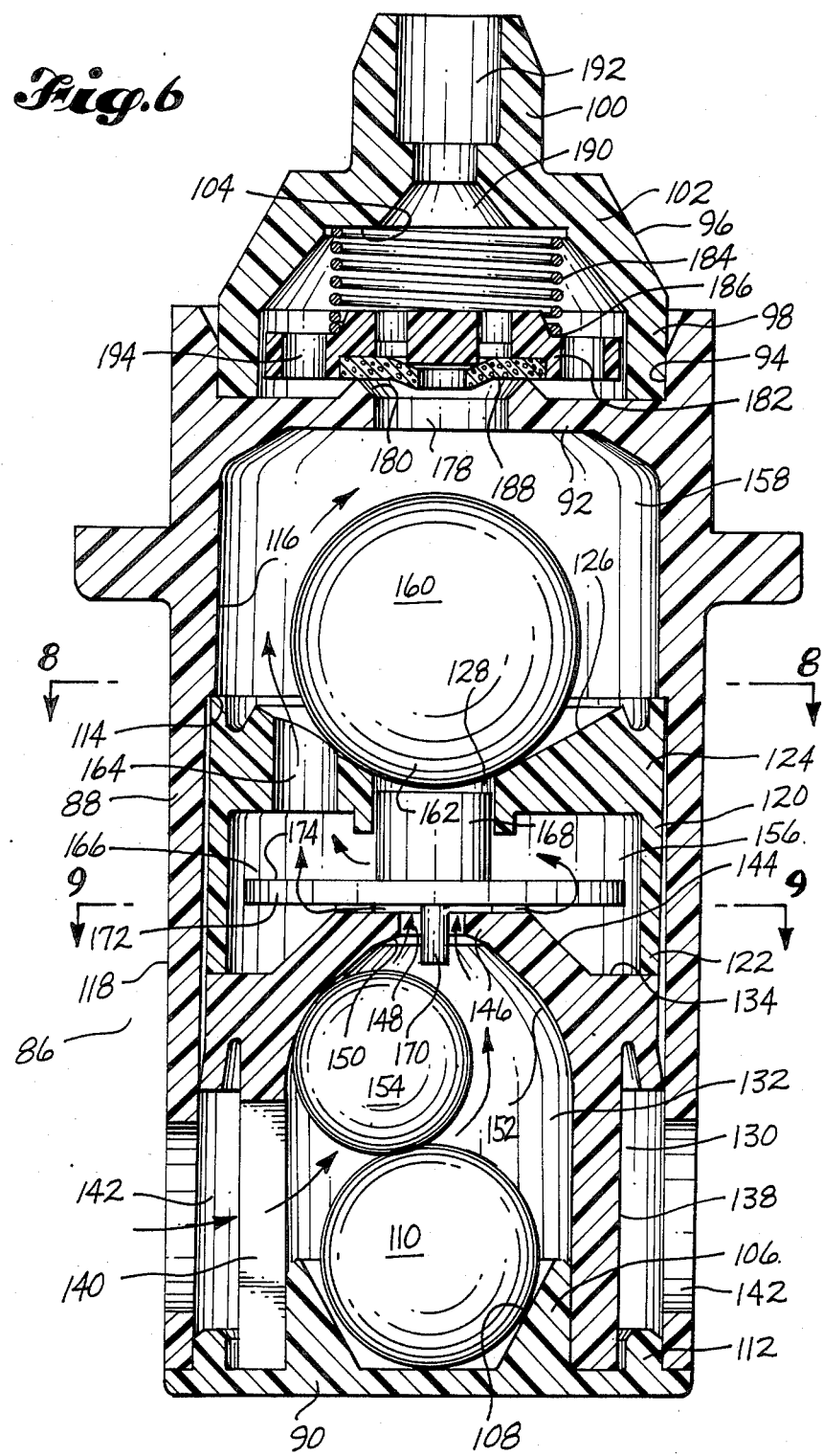
FIG. 6 is a vertical sectional view of a second embodiment of the invention, showing the static position of the various elements.
Figure 7:
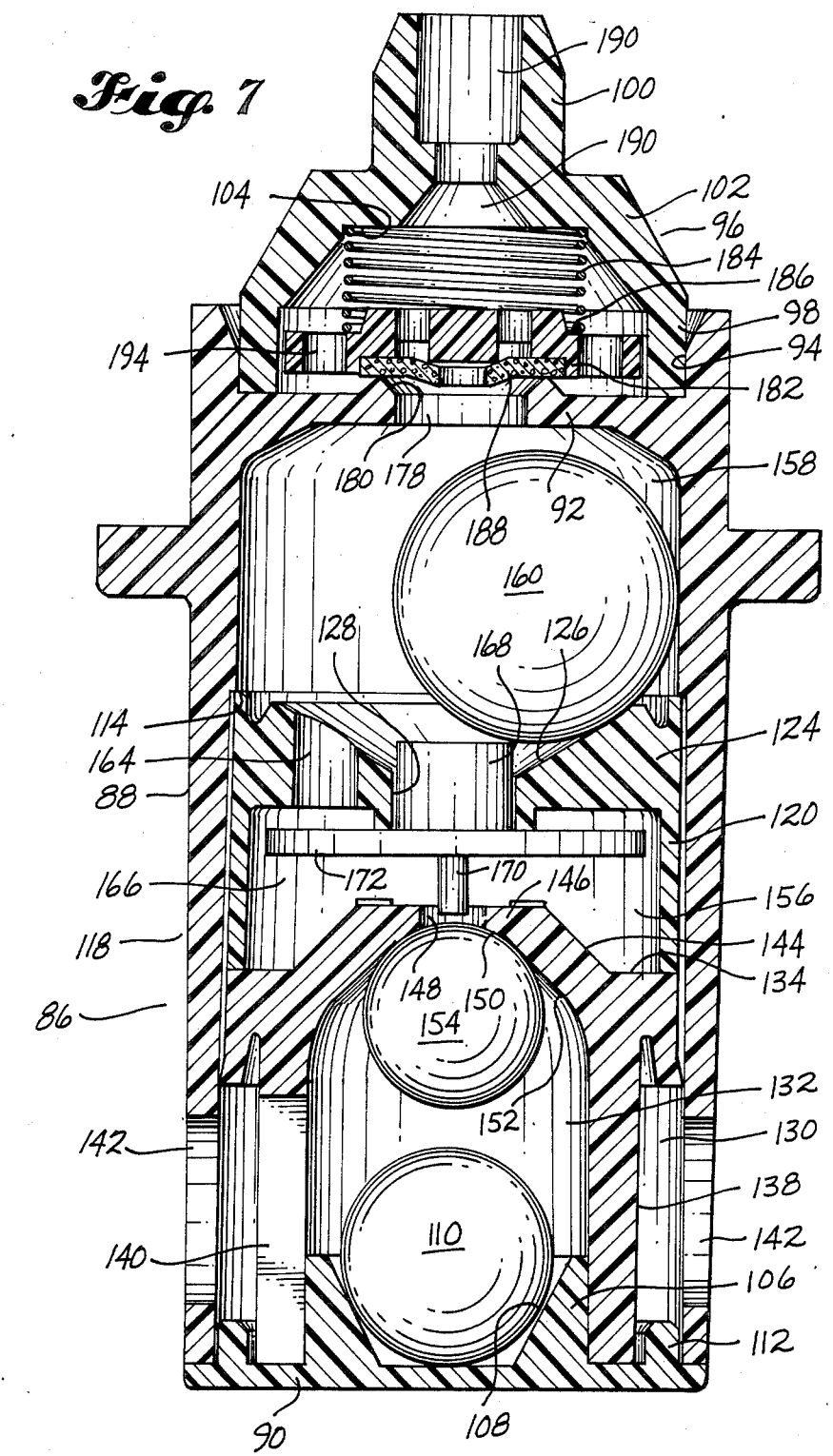
FIG. 7 is a view like FIG. 6 showing the closure valve in a seated position.
Figure 8:
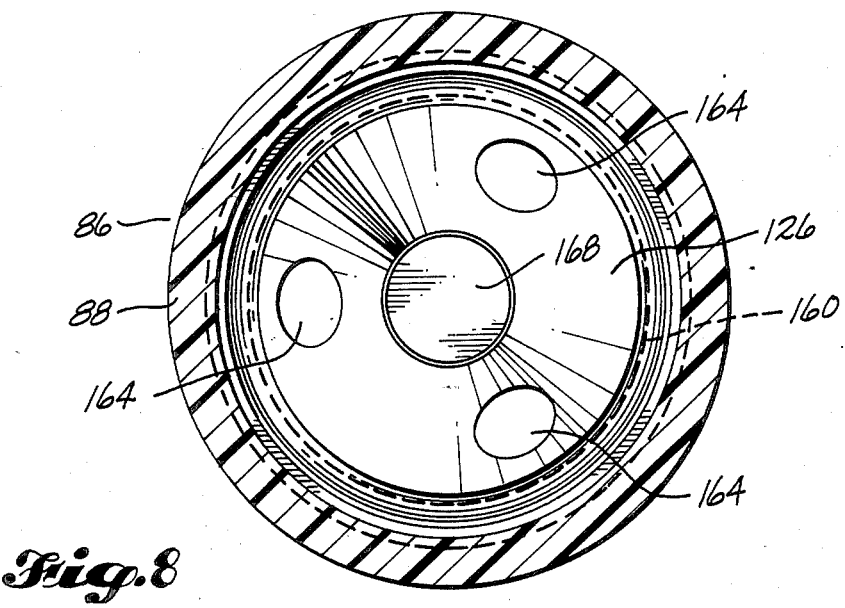
FIG. 8 is a cross-sectional view taken substantially along line 8—8 of FIG. 7.
Figure 9:
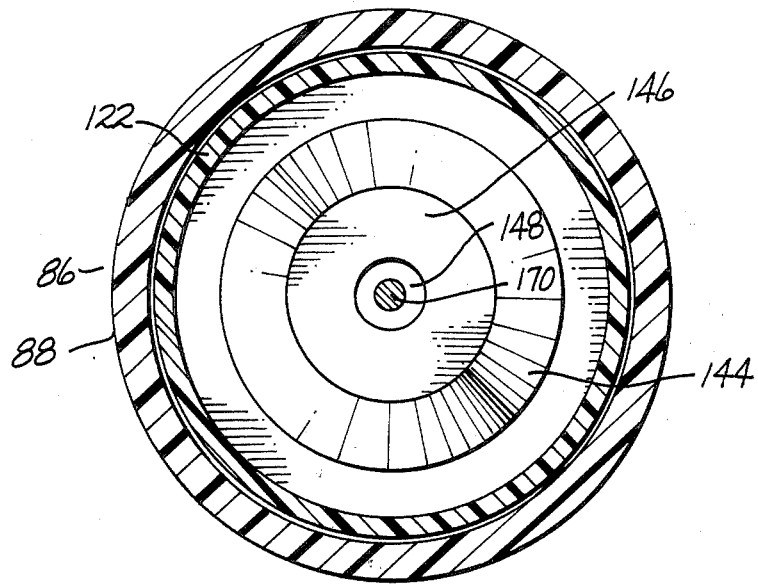
FIG. 9 is a cross sectional view taken substantially along line 9—9 of FIG. 7.

As best shown by FIGS. 2 and 5, ramp wall 52 is formed to include a plurality of radial slots 58. The illustrated embodiment includes eight such slots 58. However, this number is a variable and can change from one embodiment to the next. The outer ends of the slots 58 are shown to extend out to the cylindrical wall 50. The inner ends of the slots communicate with the central opening 54. The solid pie-shaped regions 60 between the slots 58 extend in cantilever fashion from the cylindrical wall 50. It is the upper surfaces of these pie-shaped sectors 60 which define the conical surface 56.

The upper end of housing portion 28 may also include a shallow socket 62 in which a disk-shaped closure member 64 is received.

The region below the conical wall 52 and above and to the outside of the conical wall 54 is what is referred to as the piston chamber 16. The region above conical wall 52, between it and the closure plate 64 is what is referred to as the mass chamber 15.

A piston 66 is located within the piston chamber 16. As shown by FIG. 2, piston 66 is a star-shaped structure having the same number of legs 68 as there are slots 50. The upper portions of the legs 68 extend horizontally and are located within the slots 58. The legs 68 include vertical lower portions 70 which extend downwardly into the annular space 46. The lower ends of leg portions 70 rest on the base surface 42 of chamber 16 when the parts are in their static positions and during the normal gas venting phase of operation.

Figure 4:
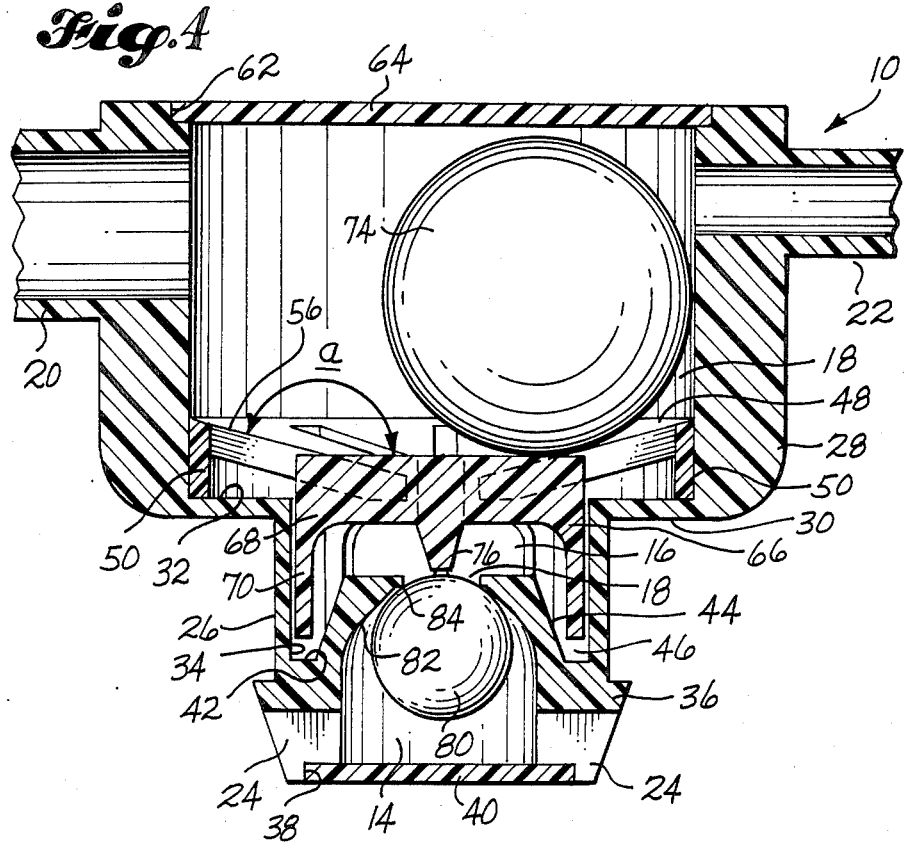
FIG. 4 is a view like FIG. 3, showing the closure ball seated.

As shown by FIG. 3, when piston 66 is resting on surface 42 its central upper surface 72 makes an obtuse angle a with the ramp surface 56 (FIG. 4). By way of typical and therefore nonlimitive example, this angle a may be about 165°.

A ball-shaped mass 74 is located within mass chamber 18. It may be constructed of brass, stainless steel or some other heavy metal or material. As shown by FIG. 3, when the gas vent valve 10 is upright the conical nature of the surface 56 will tend to center the mass 74 over the center opening 54. When in this position the ball 74 rests on the central portion of the piston 66 and acts to urge the piston 66 downwardly into a position of rest on the surface 42. A projection or peg 76 extends vertically downwardly from the central region of the piston 66. It extends towards and through an orifice 78 that is formed at the upper end of wall 44. As shown by FIG. 3, when the piston 66 is down on surface 42 the projection 76 is down far enough in the orifice 78 to prevent a closure hall 80, located within spin chamber 14, from becoming seated in the orifice 78.

Preferably, the upper surface 82 of the spin chamber 14 is conical in shape. The generally conical surface 82 intersects a radial surface in which the orifice 78 is formed. This intersection of the conical surface 82 with the radial surface also forms a lip 84.

In use, the inlet slots 24 are in communication with a space which includes both liquid and vapor under pressure. For example, the space may be a gas tank. The gas vent valve 10 may be mounted onto the upper portion of the tank. In any event, the vapor flows through the tangential slots 24. The tangential orientation of the slots 24 causes them to swirl as they pass through the spin chamber 14. The swirling gas currents contacts the closure ball 80 and cause the ball to spin around the inside of the chamber, in contact with the conical surface 82. As the ball 80 rises it spins at a faster rate because it is forced radially inwardly by the decreasing diameter of the surface 82. The wall then imparts a downwardly directed, component of reaction force to the centrifugal force developed by the ball as it spins. This downwardly directed component of force is sufficient to prevent the ball 78 from seating while it is spinning in response to normal gas flow through the vent passageway.

Owing to the presence of the lip 84, the closure ball 80 is still spinning and influenced away from a seated position even when in contact with the edge of the outlet opening 78. As a result, the ball 80 will be caused to spin and by the spinning action will be influenced away from seating in the outlet 78 immediately upon its movement out from its seated position and down over the lip 84.

In preferred form, the closure ball 80 is constructed from a light-weight bouyant material. The bouyant ball 80 spins in response to gas venting through the vent passageway and it floats upwardly and seats in response to liquid flow into the spin chamber.

Projection 76 on piston 66 makes contact with the closure ball 80 whenever the closure ball 80 is seated in the outlet opening 78. Accordingly, liquid flow that will seat the ball 80 must be sufficiently strong to lift mass 74 and piston 66.

The weight of mass 74 is not sufficient to unseat the closure ball 80 when the closure ball 80 is being seated in response to liquid forces flowing upwardly through the passageway. However, if the closure ball 80 tends to stick in a seated position after the liquid level in the spin chamber 14 has dropped, there is sufficient energy in the mass 74 to dislodge the closure ball 80 from a seated position within the outlet opening 78.

As shown by FIGS. 3 and 4, the projection 76 is smaller in diameter than the orifice 78 so that it does not block gas flow through the closure opening when the piston 66 is in its lower most position with its legs 70 in contact with the wall 42.

FIG. 4 shows the closure ball 80 seated in the orifice 78 in response to liquid flow upwardly through the passageway. It shows that the seated ball 80 exerts an upward force on piston 66, raising its legs 70 up off of the surface 42. It shows that the raising of the piston 66 does not change the angular relationship between the upper surface of the piston 66 and the ramp surface 56. It further shows that even if the mass 74 is positioned over against a side of the mass chamber 18, the mass 74 will operate to depress the piston 66 and unseat the closure ball 80 at the conclusion of liquid flow upwardly through the vent passageway. When the mass 74 is against the sidewall of mass chamber 18, a lower portion of it is in contact with the conical surface 56. Thus, the mass 74, owing to its spherical shape, always wants to roll down the ramp 56 into a centered position. In order to so move, it must contact the flat upper surface of the piston 66 and move the piston 66 downwardly. It takes only a slight downward movement of piston 66 in order for the projection 76 to dislodge the closure ball 80 from its seated position. As described above, ball 80, immediately upon being dislodged, starts spinning in response to vapor flow through the passageway. If there is no vapor flow, then the ball 80 would drop down onto the wall 40 and stay there until once again lifted by flowing vapor.

As mentioned above, closure ball 80 is preferably constructed from a buoyant material. However, in some installations, it may be possible and desirable to use a heavier material. If the vapor flow currents are strong enough, they can lift and spin a nonbuoyant ball.

As also stated above, the mass 74 must be constructed from a heavy material. The rest of the components of the device, i.e. housing 10, insert 52, piston 66 and end walls 40, 64 are preferably constructed from a molded plastic material. The end walls 40, 64 may be secured in place by the use of solvent to weld them to the walls of the sockets 38, 62.

The embodiment shown in FIGS. 6-9 comprises a housing 86 having a cylindrical sidewall 88, a bottom wall and closure 90, and an upper end wall 92. A socket 94 is formed at the upper end above the wall 92. A fitting 96 is received within the socket 94. Fitting 96 includes a cylindrical wall 98 sized to snugly fit within the socket 94, a tubular nipple 100 at its upper end, and a conical transition wall 102. A radial surface or shoulder 104 is formed at the small end of conical wall 102.

Closure 90 includes an upstanding central portion 106 having a conical inner surface 108 in which a heavy ball 110 is situated. Member 90 further includes a cylindrical lip 112 sized to plug within the lower end of cylindrical wall 88.

Wall 88 is formed to include a shoulder 114 formed where an upper section 116 meets a thinner, downwardly tapering lower section 118. Shoulder 114 serves as a stop for an insert 120. Insert 120 comprises a cylindrical lower wall 122 and a thickened top wall 124 formed to include an upper, conical ramp 126 in which a central opening 128 is formed. A second lower insert 130 is inserted into the cylindrical housing 88, below insert 120. Insert 130 defines a spin chamber 132. Insert 130 is formed to include a radial surface or shoulder 134 which makes contact with the lower end 136 of insert 120. Insert 130 includes a cylindrical sidewall 138 in which a plurality of tangential slots 140 are formed. The lower portion of sidewall 88 includes openings 142 which communicate the region outwardly of wall 88 with the lower inner region and the slots 140. The central portion 106 of member 90 extends upwardly into the cylindrical wall 138 of insert 130.

The upper end of insert 130 includes a conical wall 144. This conical wall 144 intersects a generally radial wall 146. Radial wall 146 includes a central opening 148. An annular lip 150 surrounds the opening 148. The upper inner surface portion 152 of wall 144 is preferably conical.

A closure ball 154 is located within the spin chamber 132, above the heavy ball 110. As described above, flowing gas vapors entering the spin chamber 132 via the tangential slots 140 are caused to swirl. The swirling gas currents so created contact the closure ball 154 and cause it to spin around the conical surface 152. As the ball 154 rises it spins at a faster rate because it is forced radially inwardly by the decreasing diameter of the spin chamber wall 152. The wall 152 imparts a downwardly directed component of reaction force to the centrifugal force developed by the ball as it spins. This downwardly directed component of force is sufficient to prevent the ball 154 from seating while it is spinning in response to normal gas flow through the vent passageway. As also described above, the lip 150 will cause the ball to spin and by the spinning action be influenced away from a seated position in the opening 148 immediately upon a movement of the ball 154 out from a seated position and down over the lift 150.

In this embodiment, a piston chamber 156 is defined axially between inserts 120 and 130. A mass chamber 158 is formed above insert 120. A large mass in the form of a large diameter heavy ball 160 is located within the mass chamber 158. As shown, it rests down on the conical ramp 126. The conical shape wants to keep it centered, with its lower portion 162 projecting part way down into the center opening 128. One or more openings 164 are provided axially through the upper portion 124 of insert 120, to provide free passage for gas or liquid which wants to flow upwardly through the vent passageway. In this embodiment the slope of ramp 126 is steeper than the slope of the ramp surface 158 in the first embodiment. The first embodiment is particularly suitable for an installation which lacks sufficient height to use a steep ramp. The presence of a steep ramp 126 permits the use of a simpler piston 166 for dislodging the closure ball 154. In this embodiment the piston 166 comprises an upper portion 168 which may be cylindrical. It extends upwardly into the center opening 128. Piston 166 includes a downwardly projecting member of projection 170 which extends into the orifice 148. As illustrated, member 170 is smaller in diameter than orifice 148 so that it will not interface with gas flow through the orifice 148. A positioning member 172 is located between the upper and lower portions 168, 170 of piston 166. This member 172 rests down on the top of radial wall 146. It is constructed to include passageways which readily permit vapor flow along the path indicated by the arrow 174.

In use, the normal position of ball 160 is a centered position, as illustrated. The normal position of piston 166 is a down position, as illustrated. Vapor currents flowing through the passageway are caused to swirl by the tangential inlets 140 and as they swirl through the upper part of the spin chamber 132 they cause the closure ball 154 to spin. As explained, the spinning ball 154 will not seat, leaving the orifice 148 open for flow through it of the vapor stream. The vapor stream rises, passing through the openings in piston 166, then through opening 164 into the mass chamber 158. The gases flow out through the mass chamber 158 via a suitable outlet passageway.

Liquid flow upwardly through the vent passageway will float the closure ball 154 upwardly into a seated position. The liquid imposed force is sufficient to lift piston 166 and mass 160. Upon a removal of the liquid force on ball 154, the weight of mass 170 will act to lower the weight 160. As it moves downwardly it moves with it the piston 166. This downward movement of piston 166 causes projection 170 to dislodge closure ball 154 from its seated position. It is normally caused to start swirling again, under the influence of additional vapor flow through the passageway.

As is disclosed in the aforementioned U.S. Pat. No. 4,487,215, for example, the lower heavy ball 110 functions in response to the gas vent valve tilting beyond a predetermined amount to roll up the conical surface 108 and force the closure ball 154 into a seated position. This function is also very well described in the aforementioned U.S. Pat. No. 4,325,398 and thus will not be repeated.

Gas vent valve 86 is constructed to include an over pressure relief valve 176 within the upper housing 96. As illustrated, mass chamber 158 includes a central opening 178 in the upper wall 92. The valve seat 180 is formed about the opening 178, on its outlet side. A closure member 182 is biased downwardly against the seat 180 by means of a coil compression spring 184. The upper end of spring 184 rests against shoulder 104. The lower end bears against an upper shoulder 186 on member 182. Member 182 carries an annular member 188 of rubber or a rubber-like or plastic material. The seat 180 is in the form of the relatively sharp edge which penetrates somewhat into the material 188, so that a good seal is formed where the edge 180 and member 188 make contact. As shown, the chamber 190 above closure member 182 communicates with a vent passageway 192 which extends through nipple 100. Nipple 100 may fit into a hose or other conduit for receiving the fluid which may flow out through passageway 192.

As should be evident, a pressure within mass chamber 158 sufficient to overcome the force of spring 184 will lift the closure member 182 upwardly off of the seat 180. When this happens the gas in chamber 158 will flow through the opening 178, then through openings 192 in the closure member 182, then upwardly to and through chamber 190 and passageway 192. Flow will continue until the pressure within chamber 158 drops down to a sufficient level to allow the force of spring 184 to again seat the closure member 182.

As in the first embodiment, the mass 160 is constructed from a heavy material, such as brass, stainless steel or some other heavy metal or material. Ball 110 is preferably also constructed from a heavy material and may be constructed from the same material used for ball 160. Closure ball 154 is preferably constructed from a light-weight buoyant material. However, it might be possible to construct closure ball 154 from a nonbuoyant material and then construct ball 110 from a buoyant material. Strong gas currents can spin a nonbuoyant closure ball and generate downwardly directed forces which are strong enough to prevent such closure ball from seating and also hold down a buoyant lower ball. Then, liquid flow through the vent passageway, acting on the lower buoyant ball, will cause it to move upwardly, moving with it the heavier closure ball, the piston and the upper mass.

The cylindrical housing 88, the closure member 90, inserts 120 and 130, piston 166, closure member 182 and upper fitting 96 may all be constructed from molded plastic. These parts may be injection molded. The end member 90 may be welded in place, by the use of solvent. The upper fitting 96 may be secured in place in the same manner.

It is to be understood that the illustrated embodiments are presented for example purposes only. The vent passageway may be constructed in a wide variety of ways. The member 90 also defines a sidewall of the spin chamber 132. In some installations it may be desirable to locate the tangential slots in this wall. Although each embodiment shows a plurality of elements functioning together, for a beneficial purpose, it is possible to construct other embodiments which will include less then all of the elements which will still be within the scope of the invention. In accordance with established principles of patent law, the examples which have been illustrated and described are not to be used to directly limit the scope of the invention, but rather, the invention is to be defined by the appended claims interpreted in accordance with established rules of patent claim interpretation, including use of the doctrine of equivalents.

What is claimed is:

1. A vent valve adapted to permit gas flow but close in response to liquid flow, comprising:
   a passageway having a normally lower inlet and a normally upper outlet;
   wall means in said passageway between said inlet and said outlet, defining an orifice;
   a closure ball in said passageway below said orifice, said closure ball having a larger diameter than said orifice;
   a conical support spaced upwardly from said orifice, said conical support including a central opening and surface means surrounding the opening and sloping upwardly and outwardly from the central opening;
   a ball-shaped mass supported on said conical support, said mass being larger in diameter than said central opening;
   a piston member between said mass and said orifice, said piston member having an upper portion positioned in the central opening and a lower portion positioned to project into said orifice, said piston being movable between a lower position in which said lower portion projects through the orifice into contact with said closure ball, to prevent the closure ball from seating in said orifice, and an upper position in which said lower portion is spaced upwardly from said orifice, in a position to not interfere with the closure ball seating; and
   wherein said conical support, said piston and said mass are so dimensioned that when the mass is centered on said conical support, said mass is in contact with the upper portion of the piston and biases the piston downwardly into said lower position.

2. A vent valve according to claim 1, further comprising wall means above and outwardly of the conical support defining a side boundary of a mass chamber, wherein the mass is located with said mass chamber, wherein said conical support, said mass and said piston are configured and sized such that when the mass is resting on the conical support and against the side boundary of the mass chamber it will not interfere with the piston moving up into said upper position.

3. A vent valve according to claim 1, further including radial slots in the conical support, extending radially outwardly from the central opening, wherein said surface means is located between said slots, and said piston includes radial portions which register with said slots and present upper surface means which make an obtuse angle of intersection with the surface means of the conical support, both when the piston is in its lower position and when it is in its upper position.

4. A vent valve according to claim 2, further including radial slots in the conical support, extending radially outwardly from the central opening, wherein said surface means is located between said slots, and said piston includes radial portions which register with said slots and present upper surface means which make an obtuse angle of intersection with the surface means of the conical support, both when the piston is in its lower position and when it is in its upper position.

5. A vent valve according to claim 1, comprising stop means offset radially outwardly from said orifice for contacting the piston when the piston is in its lower position.

6. A vent valve according to claim 3, comprising stop means offset radially outwardly from said orifice for contacting the piston when the piston is in its lower position.

7. A vent valve according to claim 4, comprising stop means offset radially outwardly from said orifice for contacting the piston when the piston is in its lower position.

8. A vent valve according to claim 1, wherein the upper portion of the piston projects upwardly from the surface means of the conical support when the piston is in its upper position, said upper portion of the piston having an upper surface which is inset within the central opening in the conical support when the piston is in its lower position.

9. A vent valve according to claim 8, wherein the lower portion of the piston is substantially smaller than the orifice, so that when it is in the orifice it will not block gas flow through the orifice.

10. A vent valve according to claim 9, further comprising passageway means between said orifice and said conical support, for allowing gas flow to occur upwardly from said orifice to and through said conical support when the piston is in its lower position.

11. A vent valve according to claim 1, comprising wall means defining a closure ball chamber below said orifice in which said closure ball is situated, a piston chamber above the orifice in which the piston is situated, and a mass chamber above the conical support in which the mass is located.

12. A vent valve according to claim 11, wherein said wall means comprises a support portion for said conical support and said conical support is an insert which includes means at its periphery which makes supporting contact with said support portion.

13. A vent valve according to claim 12, wherein said conical support has a ring-like periphery and arm portions extending radially inwardly from said ring-like portion with radial slots being defined between said arm portions and said surface means being the upper surfaces of said arm portions, and wherein said piston includes radial portions which fit into said slots.

14. A vent valve according to claim 11, wherein the wall means defining the closure ball chamber has an upper end in which the orifice is located and a lower portion, and said lower portion includes means for swirling the gas flow as the gas flow enters into the closure ball chamber, said closure ball chamber further including side wall surface means about which the closure ball spins in response to the swirling gas flow.

15. A vent valve according to claim 14, wherein the lower portion of the wall means defining the closure ball chamber includes a plurality of slots oriented to cause gas flow to swirl as it enters the closure ball chamber through said slots.

16. A vent valve according to claim 15, wherein said wall means defining the closure ball chamber has a lower end, a socket formed in said lower end, a closure plate in said socket, and wherein said slots are situated generally at the periphery of the socket and the closure plate.

17. A vent valve according to claim 11, wherein said wall means defining the piston chamber includes a substantially cylindrical sidewall which includes an upper end and a lower end, wherein said wall means defining said spin ball chamber is connected to the lower end of said cylindrical sidewall and further includes sidewall means projecting upwardly into a portion of the piston chamber, said sidewall means being spaced radially inwardly from said cylindrical sidewall, and stop means positioned radially between said cylindrical sidewall and said sidewall means, and wherein said piston includes base means which makes contact with said stop means when the piston is in its lower position.

18. A vent valve according to claim 11, wherein the wall means includes a sidewall portion for the piston chamber, a sidewall portion for the mass chamber, and shoulder means interconnecting the sidewall portion of the piston chamber with the sidewall portion of the mass chamber, and said conical support is an insert for the mass chamber having a base portion which sets down on said shoulder means.

19. A vent valve according to claim 11, wherein the sidewall means has upper and lower ends, a socket in each said end, and an enclosure plate within each said socket.

20. A vent valve according to claim 11, further including radial slots in the conical support, extending radially outwardly from the central opening, wherein said surface means is located between the slots, and said piston includes radial portions which register with said slots, and presents upper surface means which makes an obtuse angle of intersection with the surface means of the conical support, both when the piston is in its lower position and when it is in its upper position.

21. A vent valve according to claim 11, wherein the upper portion of the piston projects upwardly from the surface means of the conical support when the piston is in its lower position, and said upper portion of the piston having an upper surface which is inset within the central opening in the conical support when the piston is in its lower position.

22. A vent valve according to claim 1, comprising axially elongated sidewall means, a first insert into the sidewall means comprising said conical support and a second insert into said sidewall means including the wall means which includes the orifice, and further including a closure ball chamber, wherein the piston chamber is defined by and between the two inserts, a mass chamber is defined within said sidewall means above said conical support, said piston is within said piston chamber and said mass is within said mass chamber.

23. A vent valve according to claim 22, wherein the first insert comprises peripheral means extending axially from the conical support towards the second insert, and said second insert includes shoulder means in contact with the peripheral means of the first insert.

24. A vent valve according to claim 23, wherein the sidewall means includes a stop positioned to engage the upper end of the first insert, for fixing the position of said first insert within the sidewall means.

25. The vent valve according to claim 23, wherein the second insert includes annular flap means having a radial portion connected to an upper portion of the second insert and an axial portion which extends from said radial portion, with a space existing radially inwardly of said flap, said flap having an outer dimension which is larger than the inside dimension of the sidewall means, so that said flap deflects radially inwardly into said space when the second insert is inserted into said sidewall means.

* * * * *

UNITED STATES PATENT AND TRADEMARK OFFICE
CERTIFICATE OF CORRECTION

PATENT NO. : 4,702,268

DATED : October 27, 1987

INVENTOR(S) : Armbruster et al.

It is certified that error appears in the above-identified patent and that said Letters Patent are hereby corrected as shown below:

In the heading, under "UNITED STATES PATENT", the inventor's name should be spelled  -- Armbruster --.

In the heading, after "Inventors:", "Kurt Ambruster" should be -- Kurt Armbruster --.

Column 1, line 34, after "closure ball", insert -- is located in the passageway below the orifice. The closure ball --.

Column 2, line 56, "chamber 15" should be -- chamber 16 --.

Column 3, line 28, "angle a" should be -- angle $\underline{a}$ --.

Column 3, line 29, "angle a" should be -- angle $\underline{a}$ --.

Column 3, line 45, "closure hall" should be -- closure ball --.

Column 3, line 59, "contacts" should be -- contact --.

Signed and Sealed this

Third Day of May, 1988

*Attest:*

DONALD J. QUIGG

*Attesting Officer*     *Commissioner of Patents and Trademarks*